Feb. 4, 1964   E. W. SEKELSKY   3,120,256
TRACTION DEVICE FOR VEHICLE WHEELS
Filed May 10, 1963   2 Sheets-Sheet 2
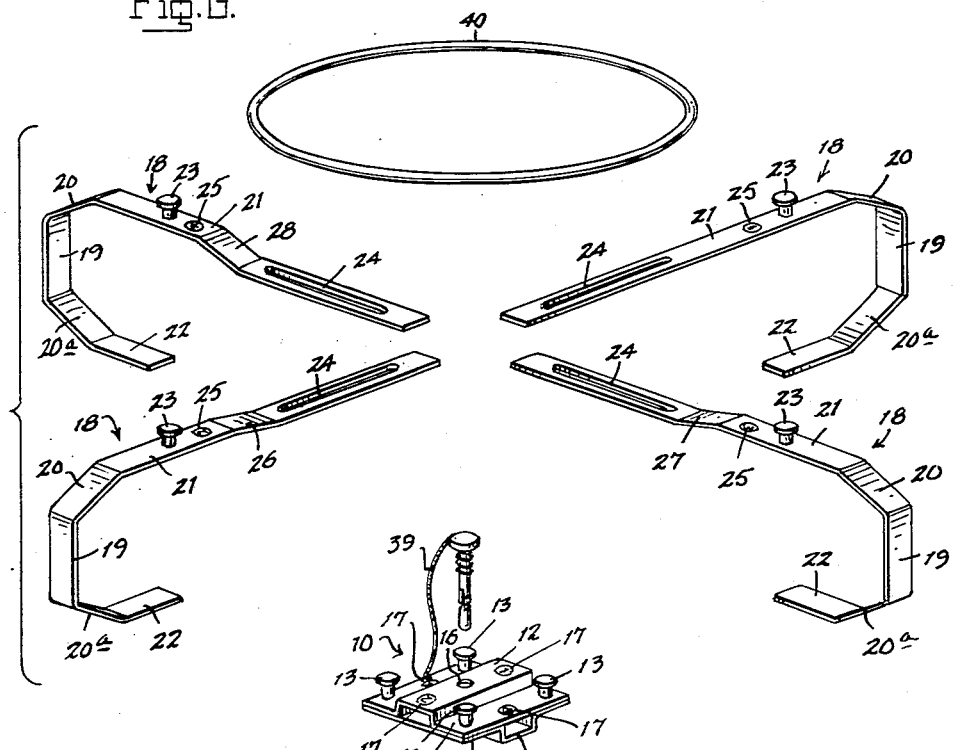
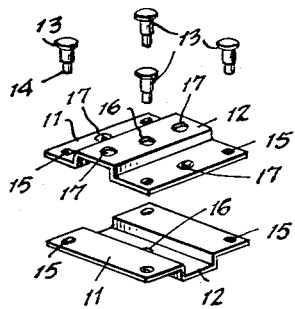
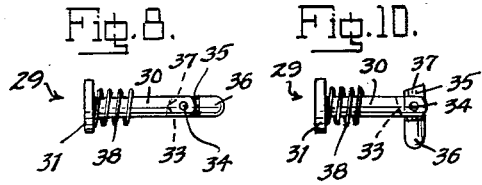
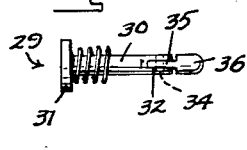
INVENTOR.
EDWARD W. SEKELSKY.
BY
ATTORNEY.

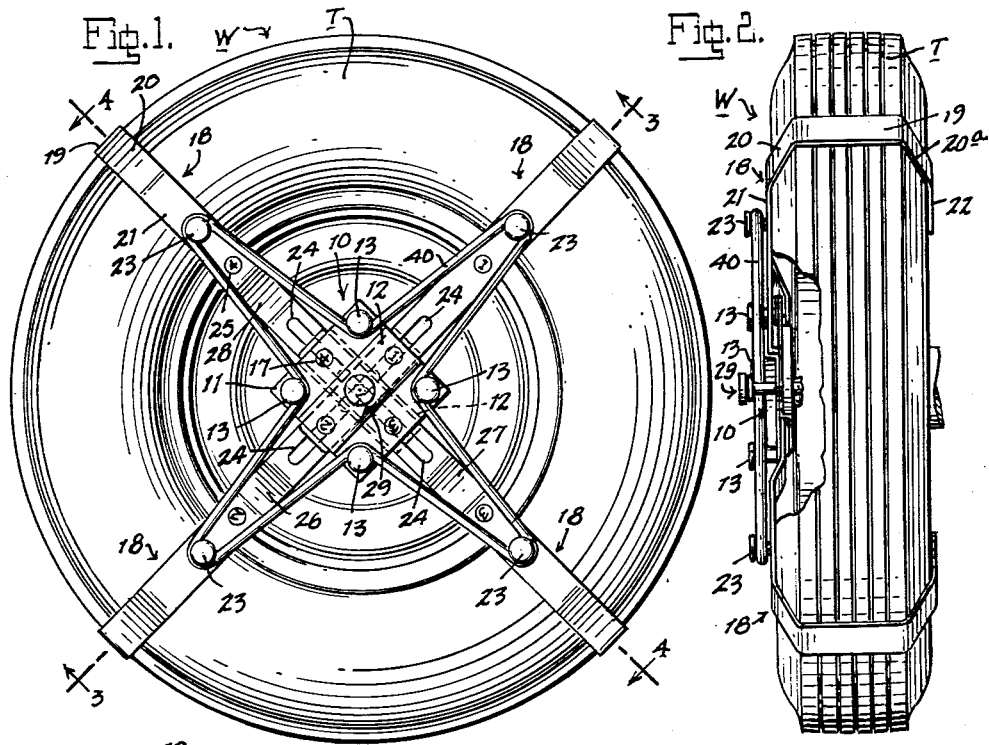
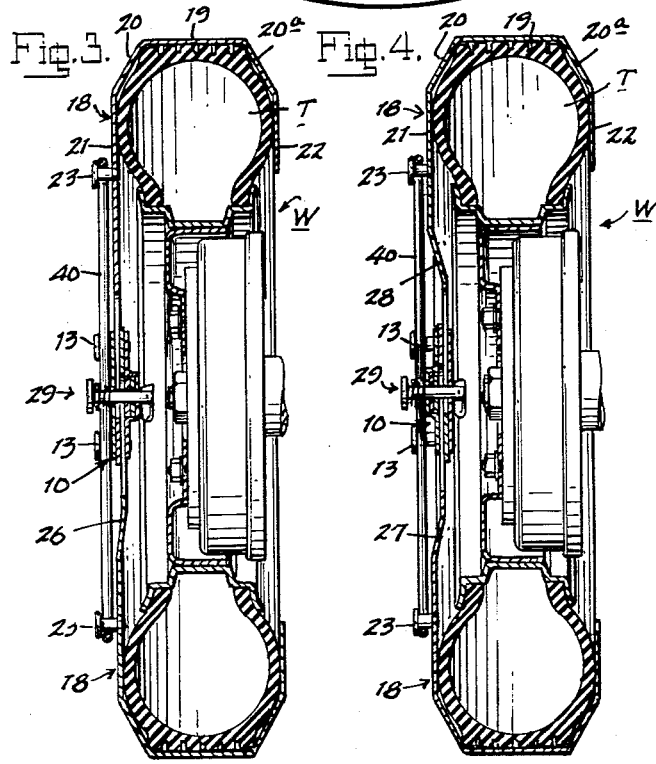
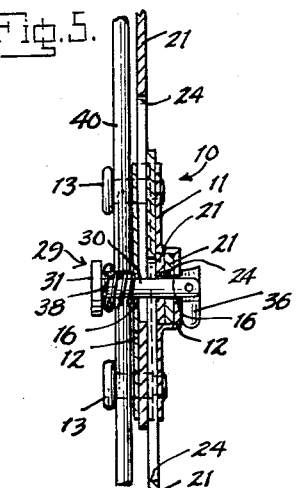

United States Patent Office 3,120,256
Patented Feb. 4, 1964

3,120,256
TRACTION DEVICE FOR VEHICLE WHEELS
Edward W. Sekelsky, 205 Bunnyview Drive,
Stratford, Conn.
Filed May 10, 1963, Ser. No. 279,562
6 Claims. (Cl. 152—218)

The present invention relates to a traction device for vehicle wheels, particularly those equipped with pneumatic tires, and has for an object to provide a device of this character which may be quickly and easily applied to or removed from the wheel from its outer side and without the necessity for jacking up the vehicle. A further object is to provide a traction device comprising a small number of relatively movable parts which may quickly and easily be separated from each other for compact storage when not in use, and assembled in operating relationship during the installation of the traction device upon the wheel.

Another object is to provide a traction device of rugged construction to withstand the rough usage to which such devices are subjected in use, and which will effectually provide traction in snow, ice, mud, sand and similar environments where the wheel would normally lose traction. A further object is to provide a traction device provided with a plurality of equally spaced radially disposed shoe members, each independently yieldable with the tire as the portion of the tire embraced thereby comes into engagement with the ground during rotation of the wheel.

Another object is to provide a traction device in which the shoe members are telescopically slideable in a centering slider unit, which receives the inner end portions of the shoe members in overlapping relation and effectually positions them against angular movement relatively to each other while permitting their free independent yielding movement in a radial direction. A further object is to provide an improved tensioning means in the form of a single elastic ring interconnected between the shoe members and the centering slider unit.

Other objects and advantages will become apparent from a consideration of the following detailed description taken in connection with the accompanying drawings wherein a satisfactory embodiment of the invention is shown. However, it will be understood that the invention is not limited to the details disclosed but includes all such variations and modifications as fall within the spirit of the invention and the scope of the appended claims.

In the drawings:

FIG. 1 is an outer side elevation of a vehicle wheel equipped with the traction device according to the invention;

FIG. 2 is a front elevation, partially broken away;

FIG. 3 is a sectional view, taken along the line 3—3 of FIG. 1;

FIG. 4 is a sectional view, taken along the line 4—4 of FIG. 1;

FIG. 5 is a sectional view on an enlarged scale of the central portion of the traction device as seen in FIG. 3;

FIG. 6 is a perspective view of the parts of the traction device in separated relation;

FIG. 7 is a perspective view of the parts of the central slider unit in separated relation;

FIG. 8 is a side elevation on an enlarged scale of the locking pin for cooperatively connecting the central slider unit and the shoe members;

FIG. 9 is a plan view of the pin as seen in FIG. 8; and

FIG. 10 is a side elevation of the pin turned 180° from the position as seen in FIG. 8 and with the pivoted locking member of the pin in transversely disposed locking position.

Referring to the drawings, the traction device for vehicle wheels, according to the exemplary embodiment of the invention illustrated therein, comprises a central slider unit 10 consisting of a matching pair of square channel plates 11—11 each having a channel formation 12 disposed centrally between its side edges and defined by longitudinal side walls and a transverse wall. The two plates are disposed with their inner sides opposed to each other and their channel formations at right angles to each other and are rigidly secured together as by welding. Four outwardly projecting headed studs 13 are respectively provided at the four corners of the forward side of the unit, each having a rivet end 14 engaged in registering holes 15 in the pair of plates and secured by heading over at the rearward side. These studs may serve to secure the plates together in addition to or in place of the welding. Centrally disposed registering holes 16 are provided in the transverse walls of the respective channel formations 13 to receive a locking pin, as will hereinafter more fully appear, and the forward plate of the unit is suitably provided with indicia 17, for example, the numbers "1," "2," "3" and "4," for the purpose of indicating the individual positioning relationship of the four shoe members, as will presently more fully appear, the indications "1" and "2" being adjacent the respective ends of the channel formation 12 of the forward plate and the indications "3" and "4" being adjacent the respective ends of the channel formation 12 of the rearward plate.

The shoe members 18 are formed of strip metal stock, preferably mild steel, suitably tempered following the shaping of the members to give them a degree of resilience as well as resistance to distortional bending. The width of the strip stock is slightly less than the inside width dimension of the channel formations 12 of the slider unit and its thickness is slightly less than half the depth of each of the channel formations, so that the overlapping ends of each pair of shoe members will have free sliding engagement in each of the channel formations.

Each shoe member is of generally J-shape, and comprises an outer hook portion consisting of a transverse tread part 19 for disposition over the tread of the tire T, inclined parts 20 and 20a respectively connecting the tread part to a relatively long forward leg 21 for disposition at the outer side of the wheel W, and a relatively short rearward leg 22 for disposition at the inner side of the wheel. An outwardly projecting headed stud 23 is riveted to the forward leg 21 contiguous to the inclined part 20 and the inner end portion of the forward leg is provided with a longitudinal slot 24 for registry with the center holes 16 of the central slider unit, as will presently more fully appear.

In order to provide the hook portions of the shoe members of uniform size to uniformly embrace the tire and permit their inner overlapped ends to have free sliding movement in parallel planes within the central slider unit, the inner ends of the respective shoe members are disposed in different planes and each member is suitably provided with indicia 25, for example, the numbers "1," "2," "3" and "4," corresponding to the indicia 17 of the central slider unit, to indicate the proper interengaging relation of the respective shoe members with the slider unit. The No. 1 and No. 2 shoe members are adapted to have their inner slotted end portions engaged in overlapped relation in the forwardly disposed channel formation of the slider unit and to extend radially therefrom in longitudinal alignment with each other, and for this purpose the leg 21 of the No. 1 shoe member is straight along its full length and the leg 21 of the No. 2 shoe member is provided intermediate the stud 23 and the outer end of the slot 24 with an offset bend 26 which offsets the inner slotted end portion an amount substantially corresponding to the thickness of the strip stock of which the shoe members are formed. The No. 3 and No. 4 shoe members are adapted to have their inner ends similarly overlapped and engaged in the rearward channel formation 12 of the slider unit, and for this purpose the No. 3 shoe member is provided with an offset bend 27 offsetting its inner slotted end portion an amount substantially corresponding to twice the thickness of the strip stock, and the No. 4 shoe member is provided with an offset band 28 offsetting its inner slotted end portion an amount substantially corresponding to three times the thickness of the strip stock.

In the engaged relation of the shoe members with the central slider unit they are locked against separation therefrom while still having relative individual sliding movement therein, and for this purpose a locking pin 29 is inserted through the center holes 16 of the center unit and through the registering slots 24 of the shoe members. This locking pin is preferably such that it can be freely inserted or removed and is self-locking in its operative relation, and comprises a cylindrical shank 30 provided at its outer end with a head 31 and at its inner end with a slot 32 having an inclined inner wall 33, and within which there is pivoted by means of a pivot shaft 34 the central web portion 35 of a locking member 36 having an inner inclined end 37, which in the extended position as seen in FIGS. 8 and 9 seats against the inclined inner wall 33 of the slot 32. In the position of the pin as seen in FIG. 8 the locking member 36 is axially aligned with the shank 30 through abutment of the inclined end 37 with the inclined wall 33, and the pin is held in this position when being inserted in the central slider unit. A helical compression spring 38 surrounding the shank 30, and preferably secured to the head 31, is adapted to permit the pin to be pressed inwardly to the point where the slot 32 will clear the rearward side of the slider unit whereupon the pin is rotated 180° to the point where the locking member 36 will swing by gravity to the transverse locking position as seen in FIG. 10. At this point the pin is released under the pressure of the spring 38 to thus draw the transversely disposed locking member 36 against the rearward side of the slider unit where it will thus be retained in locking position. In order to remove the pin it is pressed inwardly against the pressure of the spring 38 and rotated to the point where the locking member 36 swings by gravity to the axially aligned position as seen in FIG. 8, where it is retained through engagement of the inclined end 37 with the inclined wall 33 to thus permit the pin to be drawn out of the slider unit. In order to prevent possible loss of the pin it is preferably made captive to the slider unit, as by a flexible cable 39 soldered or otherwise suitably secured at its ends to the head of the pin and to the slider unit as seen in FIG. 6.

The shoe members 18 are yieldably connected to the central slider unit 10 by an elastic ring 40, preferably an O-ring formed of rubber, nylon or other suitable elastic material. Following placement of the shoe members and the slider unit upon the wheel the ring is first engaged about the studs 23 of the shoe members and thereupon the four sections of the ring extending between the studs 23 are drawn inwardly under tension and hooked about the studs 13 of the slider unit. Thus equal tension is applied to the respective shoe members to draw the outer tread portions inwardly against the tread of the tire while at the same time permitting each shoe member, as it comes into contact with the ground, to have independent inward yielding movement with the inward yielding of the portion of the tire engaged thereby.

In the operation of placing the device upon the wheel one pair of shoe members, for example the No. 1 and No. 2 shoe members, are engaged with the outer channel of the slider unit, with the inner end of the No. 1 shoe overlying the inner end of the No. 2 shoe, and these parts are then placed upon the wheel substantially in the diagonal position as seen in FIG. 1. Thereupon the other pair of shoe members, No. 3 and No. 4, are slid into place in the rearward channel of the slider unit, and the locking pin 29 is inserted through the holes 16 of the slider unit and the slots 24 of the shoe members. As above pointed out this locking pin is inserted in the straight position, as seen in FIG. 8, and is thereupon rotated 180° to allow the locking member 36 to swing by gravity into its transverse locking position, whereupon it is drawn by the spring 38 against the rearward side of the slider unit where it will be held in locked position against looseness. The elastic ring 40 is then placed about the outer sides of the studs 23 of the shoe members and hooked about the inner sides of the studs 13 of the slider unit, to thus apply uniform tension to the shoe members and centralize the slider unit in the assembled relation. In this relation the closed ends of the slots 24 are spaced from the locking pin so that, while the locking pin will prevent separation of the shoe members from the slider unit, limited independent inward and outward yielding movement of the shoe members is permitted in parallel planes normal to the wheel axis. It is noted that the heads of the studs 13 and 23 are disposed in a common plane normal to the wheel axis and thus position the four arms of the elastic ring so that they exert substantially straight line pull upon the respective shoe members to allow for their free sliding movement without cramping within the slider unit.

To remove the device from the wheel the installation procedure is reversed, the elastic ring and the locking pin being removed to release the shoe members, and the latter then being slit out of engagement with the slider unit. The separated parts may then be compactly stored.

What is claimed is:

1. A traction device for a vehicle wheel having a tire, comprising:
   a centering slider unit for disposition centrally of the wheel having a plurality of open-ended guide channels crossing each other;
   a plurality of pairs of substantially J-shaped shoe members,
      each shoe member having a transverse outer end for disposition over the tire tread, a short leg for disposition at the inner side of the wheel, and a long leg for disposition at the outer side of the wheel,
      the shoe members of each pair being longitudinally aligned with the inner end portions of their long legs overlapped and slideably engaged in a respective guide channel,
      the outer end portions of said long legs being disposed in a common plane normal to the wheel axis to engage the outer side of the tire, and the overlapped inner end portions of the long legs of at least some of said shoe members being offset with respect to said outer end portions whereby each of said inner end portions is disposed in a separate plane normal to the wheel axis; and
   elastic means connected between said shoe members and said slider unit to yieldably draw the outer ends of said shoe members inwardly toward said slider unit.

2. A traction device for a vehicle wheel having a tire, comprising:
   a centering slider unit for disposition centrally of the wheel having a plurality of open-ended guide channels crossing each other;
   a plurality of pairs of substantially J-shaped shoe members,
      each shoe member having a transverse outer end for disposition over the tire tread, a short leg for disposition at the inner side of the wheel, and a long leg for disposition at the outer side of the wheel, the shoe members of each pair being longitudinally aligned with the inner end portions of their long legs overlapped and slideably engaged in a respective guide channel;

a projecting stud means provided on the long leg of each of said shoe members along a central longitudinal radius line thereof;

a plurality of projecting stud means corresponding in number to the number of shoe members provided on said slider unit along radius lines midway between said first mentioned radius lines; and an elastic ring engaged under tension outwardly about said stud means of said shoe members and inwardly about said stud means of said slider unit.

3. The invention as defined in claim 2, wherein said studs of said shoe members and said slider unit have retaining heads disposed in a common plane normal to the wheel axis, and wherein said elastic ring is disposed in a common plane normal to the wheel axis.

4. A traction device for a vehicle wheel having a tire, comprising:

a centering slider unit for disposition centrally of the wheel having a plurality of open-ended guide channels crossing each other, each said channel comprising longitudinal side walls and a transverse wall having a center hole, the center holes of said channels being in axial register;

a plurality of pairs of substantially J-shaped shoe members, each shoe member having a transverse outer end for disposition over the tire tread, a short leg for disposition at the inner side of the wheel, and a long leg for disposition at the outer side of the wheel, there being a longitudinal slot in the inner end portion of said long leg having closed ends, the shoe members of each pair being longitudinally aligned with their slotted inner end portions overlapped and slideably engaged in a respective guide channel with their slots in register with said center holes;

a locking pin engaged in said registering center holes and slots to limit the inward and outward sliding movement of said shoe members through abutment with the closed ends of said slots; and elastic means connected between said shoe members and said slider unit to yieldably draw the outer ends of said shoe members inwardly toward said slider unit.

5. A traction device for a vehicle wheel having a tire, comprising:

a centering slider unit for disposition centrally of the wheel having a pair of open-ended guide channels crossing each other at right angles, each said channel comprising longitudinal side walls and a transverse wall having a center hole, the center holes of said channel being in register;

two pairs of substantially J-shaped shoe members, each shoe member having a transverse outer end for disposition over the tire tread, a short leg for disposition at the inner side of the wheel, and a long leg for disposition at the outer side of the wheel, there being a longitudinal slot in the inner end portion of said long leg having closed ends, the shoe members of each pair being longitudinally aligned with their slotted inner end portions overlapped and slideably engaged in a respective guide channel with their slots in register with said center holes;

a locking pin engaged in said registering center holes and slots to limit the inward and outward sliding movement of said shoe members through abutment with the closed ends of slots;

a projecting stud means provided on the long leg of each of said shoe members along a central longitudinal radius line thereof;

four projecting stud means provided upon said slider unit at the corners of a square along radius lines midway between said first mentioned radius lines; and an elastic ring engaged under tension outwardly about said stud means of said shoe members and inwardly about said stud means of said slider unit to yieldably draw the outer ends of said shoe members inwardly toward said slider unit.

6. The invention as defined in claim 5, further characterized in that the outer end portions of said long legs of said shoe members are disposed in a common plane normal to the wheel axis to engage the outer side of the tire, and the overlapped inner portions of the long legs of at least some of said shoe members are offset with respect to said outer end portions whereby each of said inner end portions is disposed in a separate plane normal to the wheel axis.

References Cited in the file of this patent

UNITED STATES PATENTS

| | | |
|---|---|---|
| 2,450,776 | Achenbach | Oct. 5, 1948 |
| 2,886,091 | Hines | May 12, 1959 |
| 2,963,064 | Rucker | Dec. 6, 1960 |